US009468080B2

(12) United States Patent
Van Herk et al.

(10) Patent No.: US 9,468,080 B2
(45) Date of Patent: Oct. 11, 2016

(54) LIGHTING TOOL FOR CREATING LIGHT SCENES

(75) Inventors: Robert Van Herk, Eindhoven (NL); George Frederic Yianni, Eindhoven (NL); Johanna Cornelia Maria Francisca Tielens-Aarts, Deurne (NL); James Joseph Anthony McCormack, Eindhoven (NL); Arend Jan Wilhelmus Abraham Vermeulen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 784 days.

(21) Appl. No.: 13/515,919

(22) PCT Filed: Dec. 16, 2010

(86) PCT No.: PCT/IB2010/055862
§ 371 (c)(1),
(2), (4) Date: Jun. 15, 2012

(87) PCT Pub. No.: WO2011/073933
PCT Pub. Date: Jun. 23, 2011

(65) Prior Publication Data
US 2012/0286670 A1 Nov. 15, 2012

(30) Foreign Application Priority Data
Dec. 18, 2009 (EP) ..................................... 09179889

(51) Int. Cl.
*H05B 37/02* (2006.01)
(52) U.S. Cl.
CPC .................... *H05B 37/029* (2013.01)

(58) Field of Classification Search
CPC ...................................................... H05B 37/029
USPC ............................................................ 315/151
See application file for complete search history.

(56) References Cited

U.S. PATENT DOCUMENTS

| 7,502,034 | B2 | 3/2009 | Chemel et al. | |
|---|---|---|---|---|
| 2005/0036036 | A1* | 2/2005 | Stevenson | G08B 13/19608 348/211.99 |
| 2006/0256201 | A1* | 11/2006 | Shuttleworth | G08B 13/19619 348/211.9 |
| 2009/0051624 | A1* | 2/2009 | Finney et al. | 345/30 |

FOREIGN PATENT DOCUMENTS

| GB | 1588698 | 4/1981 | |
|---|---|---|---|
| NL | WO 2009010926 A2 * | 1/2009 | H05B 37/0272 |
| WO | 2008142603 A2 | 11/2008 | |
| WO | 2008142621 A1 | 11/2008 | |
| WO | 2009010926 A2 | 1/2009 | |
| WO | 2009136312 A1 | 11/2009 | |

* cited by examiner

*Primary Examiner* — Sibin Chen
*Assistant Examiner* — Metasebia Retebo
(74) *Attorney, Agent, or Firm* — Meenakshy Chakravorty

(57) ABSTRACT

A lighting tool for setting lighting parameters of a plurality of light sources (1). A processor (2) is provided which is connectable to the plurality of light sources (1), and arranged to control lighting parameters of each of the plurality of light sources (1). A position storage unit (3) is connected to the processor (2) for storing spatial positions of the plurality of light sources (1). A camera arrangement (4) is connected to the processor (2) for providing a view of at least part of a scene illuminated by the plurality of light sources (1). The processor (2) is arranged to correlate a viewing area of the camera arrangement (4) and a retrieved spatial position of one or more of the plurality of light sources (1).

14 Claims, 1 Drawing Sheet

LIGHTING TOOL FOR CREATING LIGHT SCENES

FIELD OF THE INVENTION

The present invention relates to a lighting tool and a method of setting lighting parameters of a plurality of light sources.

BACKGROUND OF THE INVENTION

U.S. Pat. No. 7,502,034 discloses a light system manager, comprising a mapping facility to automatically capture spatial positions of light sources in an environment, and a light system composer for composing a lighting show using the light sources.

SUMMARY OF THE INVENTION

According to the present invention, a lighting tool for setting lighting parameters of a plurality of light sources is provided, comprising a processor connectable to the plurality of light sources, the processor being arranged to control lighting parameters of each one of the plurality of light sources, a position storage unit connected to the processor for storing spatial positions of the plurality of light sources, a camera arrangement connected to the processor for providing a view of at least part of a scene illuminated by the plurality of light sources, wherein the processor is arranged to correlate a viewing area of the camera arrangement and a retrieved spatial position of one or more of the plurality of light sources. For example, the processor can be arranged to control the viewing area of the camera arrangement, depending on the retrieved spatial position. This embodiment allows selecting a light source, and adjusting the lighting parameters thereof as well as providing visual feedback on the adjustments made, even in case the operator of the lighting tool has no direct view of the area lit by that light source. In a further embodiment, it is possible to select a viewing area using the camera, after which the system correlates this viewing area with retrieved spatial positions of one or more of the plurality of light sources, and provides control to the user of matching light sources.

In a further aspect, the present invention relates to a method of setting light parameters of a plurality of light sources, comprising retrieving a spatial position of one or more of the plurality of light sources, correlating a viewing area of a camera arrangement with the retrieved spatial position, the viewing area comprising at least part of a scene illuminated by the plurality of light sources, and controlling lighting parameters of the one or more of the plurality of light sources.

BRIEF DESCRIPTION OF THE DRAWINGS

The present invention will be discussed in more detail below, using a number of exemplary embodiments, with reference to the attached drawings, in which.

DETAILED DESCRIPTION OF EMBODIMENTS

Many software tools exist that are used for creating light scenes or just assigning parameters to light sources such as lamps. These tools typically show a series of tiles, where each tile stands for a lamp. Using such software, the user has to keep a "map" in his mind, such that he knows which actual lamp belongs to which tile. Even if he can remember which lamp's setting he is changing, it is not easy to see the effect of changes he makes to a lighting scene when the lamp is not in his line of sight.

The solution offered by embodiments according to the present invention of a lighting tool or a method of setting lighting parameters is much simpler to operate.

Figure 1:
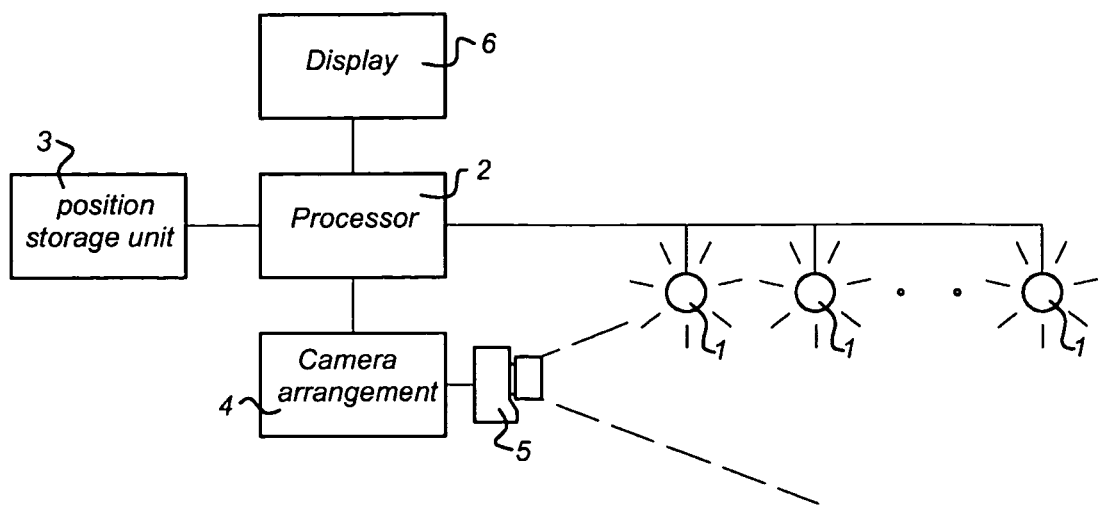
FIG. 1 shows a schematic diagram of a first embodiment of the lighting tool according to the present invention.

In FIG. 1 a schematic view is shown of an application of an embodiment of the present lighting tool. The lighting tool is used for setting lighting parameters of a plurality of light sources 1, in order to create a lighting scene in an environment illuminated by the light sources 1, e.g. a room. The light sources 1 are controlled individually by a processor 2, e.g. by controlling one or more of the parameters including, but not limited to, intensity, color, hue, saturation, lighting direction, aperture, etc.

A position storage unit 3 is in communication with the processor 2, and can store spatial position data of each of the plurality of light sources 1. The location data can be in the form of spatial co-ordinates or other relevant parameters.

A camera arrangement 4 is also in communication with the processor 2 in order to obtain a view of the scenery illuminated by the light sources 1. The camera arrangement 4 in the embodiment of FIG. 1 is provided with a single, controllable, camera 5. For example, the camera 5 can be a camera with an adjustable field of view, and can be controlled in pan, zoom and/or tilt to provide different views of the illuminated scenery. A camera 5 can be equipped with (electrical) motors to (remotely) control these camera parameters.

Figure 2:
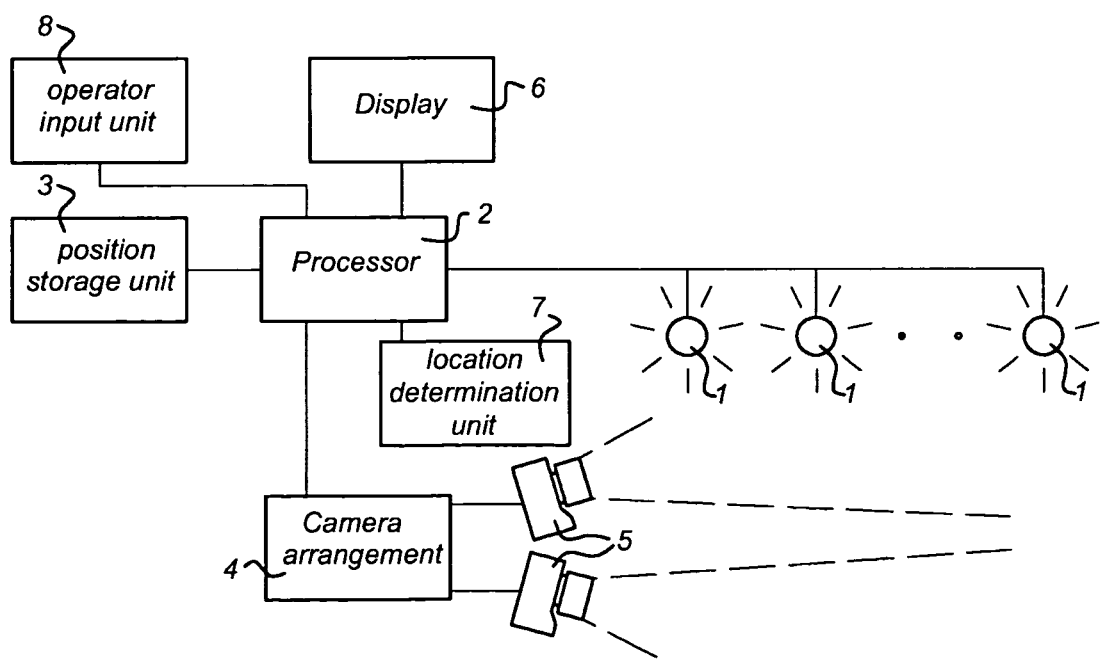
FIG. 2 shows a schematic diagram of a second embodiment of the lighting tool.

In the embodiment as shown schematically in FIG. 2, the camera arrangement 4 controls a plurality of cameras 5. In one variant, the cameras 5 each have a fixed field of view, and the processor 2 can select one of the plurality of cameras 5 to control the viewing area of the camera arrangement 4. In a further embodiment, the cameras 5 can be controlled for one or more parameters (pan, tilt, zoom), and the processor 2 can process the received data. Processing the data can take many forms, and in a further embodiment this includes merging views of various cameras 5. In a yet further embodiment this can be extended by further controlling pan, tilt, zoom parameters of one or more of the cameras 5 in combination with merging views of various cameras 5.

In both embodiments of FIG. 1 and FIG. 2, a display 6 is in communication with the processor 2, which display is arranged to display the controlled viewing area of the camera arrangement 4. In an alternative embodiment, the display 6 is connected to the camera arrangement 4, and the images displayed are controlled by the processor 2 via the camera arrangement 4.

The lighting tool as described can be used to set light parameters of a plurality of light sources 1, such as retrieving a spatial position of one or more of the plurality of light sources 1, correlating a viewing area of a camera arrangement 4 and a retrieved spatial position to obtain a view of at least part of a scene illuminated by the plurality of light sources 1, and controlling lighting parameters of each of the plurality of light sources 1.

The spatial positions can be stored in a lookup table (e.g. in the position storage unit 3) that the lighting tool uses to map each lamp's user interface representation (e.g. on the display 6 or as part of an operator input unit 8) to its coordinates in space. When the user selects a UI representation of the lamp 1 that he wants to edit, the lighting tool uses this lookup table to make a motorized camera 5 zoom into and pan to that lamp 1 or the area in which the lamp 1 generates the effect. A "real time" view of the camera 5 is shown to the user, allowing the user to see the effect of any changes he makes directly.

Conversely, the lighting tool may be constructed such that when the user changes the view of a camera 5, or selects a particular area in the camera's view, that lamp's corresponding user interface representation is indicated to the user (i.e. same associations between light source position and user interface).

The present lighting tool can be functionally extended such that the coordinates found are used to update a lighting plan in software (i.e. stored in the memory of the processor 2), such that this plan is synchronized with the real world installation of the plurality of light sources 1, solving the problem of having a lighting plan in software that is not up-to-date with the real situation.

The processor 2 is capable of retrieving the spatial position of one or more of the plurality of light sources 1, and of controlling the viewing area of the camera arrangement 4 depending on the retrieved location data.

The processor 2 is in communication with the camera arrangement 4 and receives image data. This image data may be further processed by the processor 2, e.g. to scale a specific part of a viewing area, combine views of multiple cameras 5, etc. Scaling a specific part of a viewing area can involve zoom-in and zoom-out. Furthermore, processing the image data may involve a skew operation, in order to be able to merge various images originating from cameras 5 at a different viewing angle.

The data in the position storage unit 3, i.e. the spatial positions of the plurality of light sources 1, can be preprogrammed. In a further embodiment, the processor 2 is arranged to receive and store the spatial position data, e.g. using an operator input unit 8 connected to the processor 2, as shown in the embodiment of FIG. 2. In an alternative embodiment, the processor is arranged to determine spatial positions of the plurality of light sources 1, e.g. using image processing techniques on images obtained by one or more cameras 5 of the camera arrangement 4. This latter embodiment can also be used to detect which light source 1 is in the field of view of a (selected) camera 5. This may be used by the operator to use a specific camera to select a light source 1 (e.g. by changing a camera's view, or to select a specific area in the camera's view). The processor 2 is arranged to correlate this view with stored spatial locations of the light sources 1, and select the best match. The processor 2 can then provide the operator with a user interface for controlling the lighting parameters of that specific light source 1 (and possibly also with an updated viewing area of the camera arrangement 4).

In a specific example, the processor 2 controls each one of the plurality of light sources 1 to emit light, and detects where in an environment, and due to which of the cameras 5, this light source 1 is visible. This technique is called Dark Room calibration, and involves that, in a darkened room, lamps 1 are switched on automatically one-by-one and their locations are detected using image analysis. This method is fully automatic, but requires a darkened room. Such a system and method are disclosed e.g. in U.S. Pat. No. 7,502,034.

Two basic formats that the data (coordinates) stored in the lookup table (e.g. stored spatial position data) could have, are spatial coordinates (e.g. X, Y, Z), e.g. with regard to a room or other environment, or camera view coordinates (e.g. horizontal pan, vertical pan, zoom) associated with one or more of the cameras 5. The latter coordinate system is preferred if the position of the camera 5 is fixed. In that case these coordinates can be directly fed into the camera 5 to zoom into and pan to the lamp 1 or any effect generated by the lamp 1.

In an embodiment method, an operator feeds the coordinates manually into the lighting tool, e.g. using the operator input unit 8. For instance: he sets up the camera 5 such that it pans to and zooms into a specific lamp 1. Using the lighting tool he then selects the user interface representation of that lamp 1. Finally, he instructs the lighting tool to bind (or associate) the current coordinates of the camera 5 to lamp 1 ("What you are looking at now is lamp 1"). This embodiment is simple, has to be performed only once per lamp 1, and can be performed in an incremental way for each of the lamps separately, and allows the operator to be in full control: the exact zoom factors and panning settings of a camera 5 that the user prefers are stored for each lamp 1.

In another embodiment, image analysis is used. This can for instance also be done in combination with the earlier mentioned Dark Room calibration.

Once the lighting tool is commissioned, a user can select a lamp 1 to be controlled, either by selecting it from a user interface or by clicking on its location in the camera image (as displayed on the display 6). Appropriate lamp control then becomes available in the user interface.

In a further embodiment, the lighting tool comprises a location determination unit 7 connected to the processor 2. This location determination unit 7 can implement one of the above mentioned embodiments for determining the spatial positions of the plurality of light sources. As further alternatives, the location determination unit 7 can detect spatial positions based on "coded light", in which case each light source 1 emits a different code which is invisible to the human eye, or based on beacons using RF or other wireless techniques, which are co-located with each of the light sources. Examples of coded light systems have been disclosed in e.g. International patent publication WO2009/136312.

In an embodiment using "coded light", a coded light receiver (e.g. as part of a location determination unit 7 in FIG. 2) pans over the room and reads out identifiers of light sources 1. While progressing through the room, the lighting tool learns the coordinates of each light source 1.

Yet another embodiment uses ranging technology in the lamps 1 (e.g. using ultrasound, RF signal strength, RF round trip time, impulse radio) to generate a map of the lamps 1 relative to the camera 5 (or cameras 5).

In the embodiment as shown in FIG. 2, the lighting tool comprises an operator input unit 8, connected to the processor 2. The operator input 8 may be used to receive a selection of one of the plurality of light sources, after which the processor 2 retrieves the associated spatial location from the position storage unit 2.

The present invention may also be embodied as a computer program product, e.g. in the form of a software code stored on a medium such as an optical disk (CD, DVD, BD), a semiconductor memory unit (USB stick, SD-card, etc), which comprises executable instructions. The executable instructions enable a processor (e.g. a general purpose computer provided with interface circuitry) to carry out the method embodiments as described above.

The present invention has been described hereinabove by means of a detailed description of embodiments, with reference to the attached drawings. In these embodiments, elements may be replaced by equivalent elements providing a similar functionality. The scope of the invention is determined by the language of the appended claims and its equivalents. The reference signs used refer to the embodiments described hereinabove and are not intended to limit the scope of the claims in any manner.

The invention claimed is:

1. A lighting tool for setting lighting parameters of a plurality of light sources, comprising:
   a processor connectable to the plurality of light sources, the processor being arranged to control lighting parameters of each one of the plurality of light sources,
   a position storage unit connected to the processor for storing a plurality of different camera view parameters, each of the camera view parameters denoting a different camera view and being correlated to a different one of said light sources in said storage unit,
   a camera arrangement connected to the processor for providing a view of at least part of a scene illuminated by the plurality of light sources,
   wherein the processor, in response to a user-selection of a given light source of the plurality of light sources, matches the user-selected given light source to the camera view parameter correlated to the given light source in the position storage unit and controls the camera arrangement to implement the camera view denoted by the camera view parameter correlated to the given light source.

2. The lighting tool of claim 1, wherein the processor provides control to the user of the given light source.

3. The lighting tool of claim 1, wherein the plurality of different camera view parameters comprises camera view coordinates and wherein the processor is further arranged to process data obtained from the camera arrangement.

4. The lighting tool of claim 1, wherein the processor is further arranged to receive the plurality of different camera view parameters, and to store the plurality of different camera view parameters in the position storage unit.

5. The lighting tool of claim 1, wherein the camera arrangement is further arranged to determine the plurality of different camera view parameters.

6. The lighting tool of claim 1, wherein the lighting tool further comprises a location determination unit connected to the processor for determining the plurality of different camera view parameters.

7. The lighting tool of claim 1, wherein the lighting tool further comprises an operator input unit connected to the processor, the operator input unit being arranged to receive the given light source.

8. The lighting tool of claim 1, wherein each of the camera views denoted by the plurality of different camera view parameters focuses primarily on a different, respective particular light source of said plurality of light sources or on a light effect produced by the particular light source.

9. A method of setting light parameters of a plurality of light sources, comprising:
   receiving, at a user interface, selection of a user interface representation of a light source of the plurality of light source;
   accessing a position storage unit, which stores a plurality of different camera view parameters, each of the camera view parameters denoting a different camera view and being correlated to a different one of said light sources in said storage unit, to retrieve the camera view parameter correlated with the selected light source from the position storage unit,
   controlling a viewing area of a camera arrangement by automatically modifying the viewing area of the camera arrangement based on the retrieved camera view parameter correlated with the selected light source, and
   setting lighting parameters of the selected light source.

10. The method of claim 9, wherein the plurality of different camera view parameters comprises camera view coordinates.

11. The method of claim 9, further comprising:
    receiving the plurality of different camera view parameters, and
    storing the plurality of different camera view parameters.

12. The method of 9, wherein each of the camera views denoted by the plurality of different camera view parameters focuses primarily on a different particular light source of said plurality of light sources or on a light effect produced by the particular light source.

13. A lighting tool for setting lighting parameters of a plurality of light sources, comprising:
    a processor connectable to the plurality of light sources, the processor being arranged to control lighting parameters of each one of the plurality of light sources,
    a position storage unit connected to the processor for storing a plurality of different camera view parameters, each of the camera view parameters denoting a different camera view and being correlated to a different one of said light sources in said storage unit,
    a camera arrangement connected to the processor for providing a view of at least part of the plurality of light sources,
    wherein the processor, in response to a user-selection of a given camera view parameter of the plurality of different camera view parameters, matches the user-selected given camera view parameter to the light source correlated to the given camera view parameter in the position storage unit and controls a user-interface to display a representation of the light source correlated to the given camera view parameter.

14. The lighting tool of claim 13, wherein each of the camera views denoted by the plurality of different camera view parameters focuses primarily on a different, respective particular light source of said plurality of light sources or on a light effect produced by the particular light source.

* * * * *